(12) United States Patent
Yuk et al.

(10) Patent No.: US 9,565,165 B2
(45) Date of Patent: Feb. 7, 2017

(54) SYSTEM AND METHOD FOR CONTROLLING VIRTUAL PRIVATE NETWORK ACCESS

(71) Applicant: SAMSUNG SDS CO., LTD., Seoul (KR)

(72) Inventors: Young Soo Yuk, Seoul (KR); Yang-Hwan Joe, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 14/579,050

(22) Filed: Dec. 22, 2014

(65) Prior Publication Data

US 2015/0180832 A1 Jun. 25, 2015

(30) Foreign Application Priority Data

Dec. 23, 2013 (KR) ........................ 10-2013-0161749

(51) Int. Cl.
*H04L 29/06* (2006.01)
*H04W 12/06* (2009.01)
*H04W 12/08* (2009.01)

(52) U.S. Cl.
CPC ......... *H04L 63/0272* (2013.01); *H04L 63/105* (2013.01); *H04L 63/20* (2013.01); *H04W 12/06* (2013.01); *H04W 12/08* (2013.01)

(58) Field of Classification Search
CPC .................................................. H04L 63/0272
See application file for complete search history.

(56) References Cited

U.S. PATENT DOCUMENTS

| | | | | |
|---|---|---|---|---|
| 7,673,048 B1* | 3/2010 | O'Toole, Jr. | ........ | H04L 12/4633 370/229 |
| 2008/0022391 A1* | 1/2008 | Sax | ...... | H04L 12/4679 726/15 |
| 2009/0144817 A1* | 6/2009 | Kumar | .................... | H04L 69/40 726/12 |
| 2010/0218248 A1* | 8/2010 | Nice | .................... | H04L 63/0272 726/12 |
| 2013/0205025 A1* | 8/2013 | Shamsee | ............. | H04L 63/0272 709/225 |
| 2013/0297933 A1* | 11/2013 | Fiducia | ............... | H04L 63/0853 713/156 |
| 2014/0250222 A1* | 9/2014 | Rangappan | ......... | H04L 12/2854 709/224 |

* cited by examiner

*Primary Examiner* — David Pearson
(74) *Attorney, Agent, or Firm* — Sughrue Mion, PLLC

(57) ABSTRACT

Provided are a system and method for controlling virtual private network (VPN) access. The system includes a first VPN gateway, a second VPN gateway, a wireless local area network (WLAN) access control server configured to detect a corporate intranet connection of a wireless communication terminal connecting to a corporate intranet via the first VPN gateway, and a VPN setting change server configured to receive a request to change a VPN setting of the wireless communication terminal from the WLAN access control server and control the wireless communication terminal to change the VPN gateway currently in connection with the wireless communication terminal to the second VPN gateway in accordance with the VPN setting change request.

19 Claims, 8 Drawing Sheets

SYSTEM AND METHOD FOR CONTROLLING VIRTUAL PRIVATE NETWORK ACCESS

CROSS-REFERENCE TO RELATED APPLICATION

This application claims priority to and the benefit of Korean Patent Application No. 10-2013-0161749, filed on Dec. 23, 2013, the disclosure of which is incorporated herein by reference in its entirety.

BACKGROUND

1. Field

The present disclosure relates to a technology for controlling virtual private network (VPN) access of a wireless communication terminal, and more particularly, to a system and method for controlling VPN access.

2. Discussion of Related Art

In spite of the merits of high portability and mobility, a mobile terminal has a security problem, and thus its connection to a corporate business system is generally allowed to a limited extent only. Since most general personal computers (PCs) are fixedly placed in a company and used for business only, it is relatively easy to apply a security policy by installing a security program and so on. However, most mobile terminals are owned by individuals and used in a bring your own device (BYOD) fashion, and thus, the application of a security policy is limited. In particular, when a mobile terminal connects to a corporate business system from the outside of an institution, such as a company, the problem of information leakage may arise.

Therefore, in the related art, a secure connection is set for every business application installed on a mobile terminal according to secure sockets layer (SSL), so that access to a corporation business system is allowed through such a secure connection. However, in this case, there is an inconvenience that each business application should have a separate security environment for an SSL connection.

To solve this problem, a case in which the operating system (OS) of a mobile terminal directly supports a security mode is increasing lately. In this case, the operating system of the mobile terminal is internally divided into a normal area and a secure area, and it is not possible to access data and applications installed in the secure area from the application in the normal area. After going through an authentication procedure for accessing the secure area, the mobile terminal operates in the security mode. In the security mode, an environment in which it is possible to connect to various business systems via a VPN is provided, so that business system developers may enable mobile terminals to safely connect to corporate business systems via VPNs without creating a separate security environment for every application.

Meanwhile, cases in which a mobile terminal operating in the security mode connects to a corporate business system via a VPN may be classified into the following two types. In the case of the first type, the mobile terminal connects to the corporate business system via a corporate intranet, and in the case of the second type, the mobile terminal connects to the corporate business system via a mobile communication network or a public wireless fidelity (WiFi) network from the outside of the company. Even in the same security mode, a supported security level is required to vary according to a case of the terminal being in the company and a case of the terminal being outside the company. This is because, outside the company, it may be necessary to show a confidential document to an outsider, and the terminal may be used by an outsider.

SUMMARY

The present disclosure is directed to providing a means for recognizing the connection environment of a terminal capable of connecting to a corporate business system and applying a security policy varying according to the recognized connection environment.

According to an aspect of the present disclosure, there is provided a system for controlling virtual private network (VPN) access, the system including: a first VPN gateway; a second VPN gateway; a wireless local area network (WLAN) access control server configured to detect a connection of a wireless communication terminal to a corporate intranet via the first VPN gateway; and a VPN setting change server configured to receive, from the WLAN access control server, a request to change a VPN setting of the wireless communication terminal, and to control the wireless communication terminal to change the first VPN gateway currently in connection with the wireless communication terminal to the second VPN gateway in accordance with the request to change the VPN setting.

The system may further include a WLAN controller configured to authenticate the wireless communication terminal when the wireless communication terminal initiates the corporate intranet connection; and an authentication server configured to provide authentication information for authentication of the wireless communication terminal, to the WLAN controller, wherein the WLAN access control server may determine that the wireless communication terminal is connected to the corporate intranet when the authentication of the wireless communication terminal is completed by the WLAN controller.

When the authentication of the wireless communication terminal is completed, the authentication server provides the authentication information of the wireless communication terminal to the second VPN gateway, and the second VPN gateway authenticates the wireless communication terminal using the received authentication information when the wireless communication terminal connects to the second VPN gateway.

The VPN setting change server may be a mobile device management (MDM) server.

The MDM server may control an MDM client included in the wireless communication terminal to change a connection-target VPN gateway of the wireless communication terminal to the second VPN gateway.

When a disconnection of the corporate intranet connection of the wireless communication terminal is detected, the WLAN access control server may transmit, to the VPN setting change server, a VPN setting change-back request to change back the VPN setting of the wireless communication terminal, and the VPN setting change server may control the wireless communication terminal to change the second VPN gateway currently in connection with the wireless communication terminal to the first VPN gateway in accordance with the VPN setting change-back request.

According to another aspect of the present disclosure, there is provided a wireless communication terminal including: a virtual private network (VPN) client configured to connect to a first VPN gateway and form a VPN with the first VPN gateway; a wireless local area network (WLAN) client configured to establish a wireless network connection with a corporate intranet; and a VPN setting changer configured to receive, from a VPN setting change server, when the wireless network connection of the WLAN client is completed, a first VPN gateway control request including an access address of a second VPN gateway, and to control the VPN client to change the first VPN gateway currently in connection with the VPN client to the second VPN gateway in accordance with the first VPN gateway control request.

The VPN client may form the VPN when the wireless communication terminal is in a security mode.

The VPN setting changer may be a mobile device management (MDM) client, and the VPN setting change server may be an MDM server.

The VPN client may attempt to connect to the second VPN gateway, and connect back to the first VPN gateway when the connection attempt fails.

When the wireless network connection of the WLAN client is disconnected, the VPN setting changer may receive a second VPN gateway control request from the VPN setting change server and control the VPN client to change the second VPN gateway currently in connection with the VPN client back to the first VPN gateway in accordance with the second VPN gateway control request.

According to still another aspect of the present disclosure, there is provided a wireless communication terminal including: a virtual private network (VPN) client configured to connect to a first VPN gateway and form a VPN with the first VPN gateway; and a wireless local area network (WLAN) client configured to establish a wireless network connection with a corporate intranet, and to control the VPN client to attempt to change the first VPN gateway currently in connection with the VPN client to a second VPN gateway when the wireless network connection is completed.

The VPN client may attempt to connect to the second VPN gateway in a connection attempt, and connect back to the first VPN gateway when the connection attempt fails.

When the wireless network connection with the corporate intranet is disconnected, the WLAN client may control the VPN client to change the second VPN gateway currently in connection with the VPN client back to the first VPN gateway.

According to still another aspect of the present disclosure, there is provided a method of controlling virtual private network (VPN) access, the method including: detecting, by a wireless local area network (WLAN) access control server, a connection of a wireless communication terminal attempting to connect to a corporate intranet via a first VPN gateway; receiving, by a VPN setting change server, a request to change a VPN setting of the wireless communication terminal, from the WLAN access control server; and controlling, by the VPN setting change server, the wireless communication terminal to change the first VPN gateway currently in connection with the wireless communication terminal to a second VPN gateway in accordance with the request to change a VPN setting.

The method may further include, before the detecting of the corporate intranet connection: when the wireless communication terminal attempts the corporate intranet connection, receiving, by a WLAN controller, authentication information of the wireless communication terminal, from an authentication server; and authenticating, by the WLAN controller, the wireless communication terminal using the received authentication information, wherein the detecting of the corporate intranet connection may include determining that the wireless communication terminal has connected to the corporate intranet when the authentication of the wireless communication terminal is completed by the WLAN controller.

The method may further include, after the authenticating of the wireless communication terminal, providing, by the authentication server, the authentication information of the wireless communication terminal to the second VPN gateway, wherein the second VPN gateway may authenticate the wireless communication terminal using the received authentication information when the wireless communication terminal connects to the second VPN gateway.

The method may further include, when a disconnection of the corporate intranet connection of the wireless communication terminal is detected, transmitting, by the WLAN access control server to the VPN setting change server, a VPN setting change-back request to change back the VPN setting of the wireless communication terminal, wherein the VPN setting change server may control the wireless communication terminal to change the VPN gateway currently in connection with the wireless communication terminal to the first VPN gateway in accordance with the VPN setting change-back request.

According to still another aspect of the present disclosure, there is provided a method of controlling virtual private network (VPN) access of a wireless communication terminal, the method including: connecting, by a VPN client, to a first VPN gateway and forming a VPN with the first VPN gateway; establishing, by a wireless local area network (WLAN) client, a wireless network connection with a corporate intranet; receiving, by a VPN setting changer when the wireless network connection of the WLAN client is completed, a first VPN gateway control request from a VPN setting change server; and controlling, by the VPN setting changer, the VPN client to attempt to change the first VPN gateway currently in connection with the VPN client to the second VPN gateway in accordance with the first VPN gateway control request.

The VPN client may form the VPN when the wireless communication terminal is in a security mode.

The VPN client may attempt to connect to the second VPN gateway in a connection attempt, and connect back to the first VPN gateway when the connection attempt fails.

When the wireless network connection of the WLAN client is disconnected, the VPN setting changer may receive a second VPN gateway control request from the VPN setting change server and control the VPN client to change the VPN gateway currently in connection with the VPN client back to the first VPN gateway in accordance with the second VPN gateway control request.

According to still another aspect of the present disclosure, there is provided a method of controlling virtual private network (VPN) access, the method including: connecting, by a VPN client, to a first VPN gateway and forming a VPN with the first VPN gateway; establishing, by a wireless local area network (WLAN) client, a wireless network connection with a corporate intranet; and controlling, by the WLAN client, the VPN client to attempt to change the first VPN gateway currently in connection with the VPN client to a second VPN gateway when the wireless network connection is completed.

The VPN client may attempt to connect to the second VPN gateway in a connection attempt, and connect back to the first VPN gateway when the connection attempt fails.

When the wireless network connection with the corporate intranet is disconnected, the WLAN client may control the VPN client to change the second VPN gateway currently in connection with the VPN client back to the first VPN gateway.

BRIEF DESCRIPTION OF THE DRAWINGS

The above and other objects, features, and advantages of the present disclosure will become more apparent to those of ordinary skill in the art by describing, in detail, exemplary embodiments thereof with reference to the accompanying drawings, in which.

DETAILED DESCRIPTION OF EXEMPLARY EMBODIMENTS

Hereinafter, embodiments of the present disclosure will be described in detail with reference to the accompanying drawings. However, the embodiments are for illustrative purposes only and are not intended to limit the scope of the disclosure.

In describing the present disclosure, any detailed description of the related art of the disclosure will be omitted if it is deemed that such a description will obscure the gist of the disclosure unintentionally. In addition, terms described below are defined in consideration of functions in the present disclosure, which may be changed according to the intention, practice, etc. of a user or an operator. Therefore, the definitions of these terms should be made, based on the overall description of this specification. The terminology used in the detailed description is only for describing embodiments of the present disclosure and is not intended to be limiting. Unless the context clearly indicates otherwise, the singular forms "a," "an," and "the" are intended to include the plural forms as well. It will be understood that the terms "comprises," "comprising," "includes," "including," "have," and "having" are used herein to indicate the presence or addition of features, figures, steps, operations, elements, or parts or combinations thereof, but do not preclude the presence or addition to the description. Likewise, combinations described in the context of example embodiments are mentioned for the sake of completeness, even though sub-combinations thereof are within the scope and spirit of this disclosure.

Figure 1:
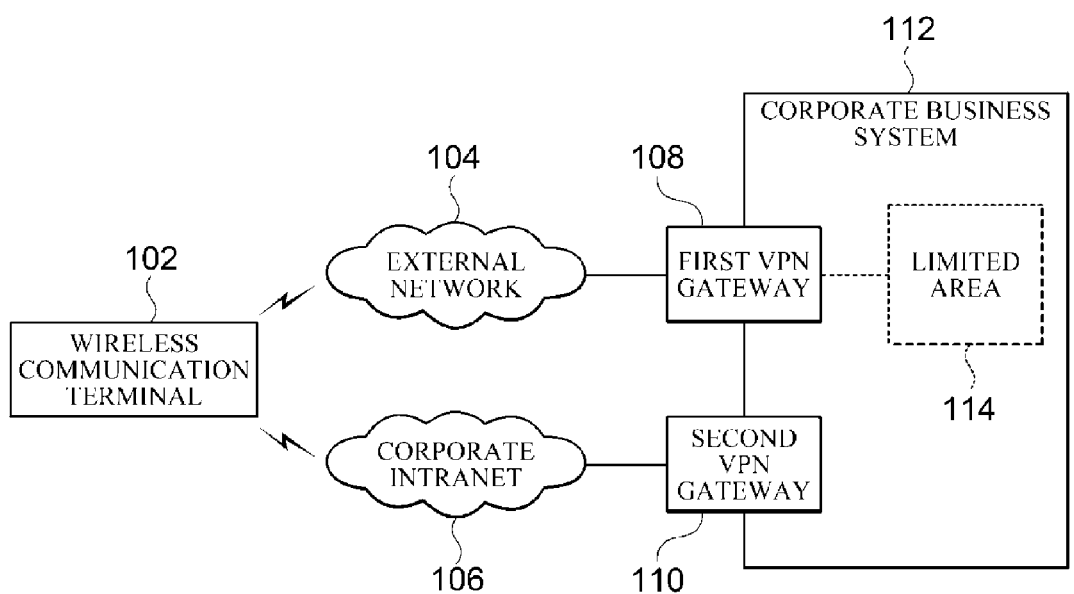
FIG. 1 is a block diagram of a system for controlling virtual private network (VPN) access according to an exemplary embodiment of the present disclosure.

FIG. 1 is a block diagram of a system 100 for controlling virtual private network (VPN) access according to an exemplary embodiment of the present disclosure. The system 100 for controlling VPN access according to an exemplary embodiment of the present disclosure includes a wireless communication terminal 102, an external network 104, a corporate intranet 106, a first VPN gateway 108, a second VPN gateway 110, and a corporate business system 112.

The wireless communication terminal 102 is intended to constitute a VPN together with the first VPN gateway 108 or the second VPN gateway 110 via the external network 104 or the corporate intranet 106, and to exchange data with the corporate business system 112 via the VPN. In an exemplary embodiment, the wireless communication terminal 102 may have a normal area and a secure area separated from each other. In this case, the wireless communication terminal 102 may be set to constitute a VPN with the first VPN gateway 108 or the second VPN gateway 110 only when operating in the secure mode.

The external network 104 and the corporate intranet 106 are classified according to entities providing network resources. Specifically, the corporate intranet 106 denotes a network provided by an entity that is the same as or closely related to the corporate business system 112, and the external network 104 denotes a network provided by a service provider other than such an entity providing the corporate intranet 106. For example, the external network 104 may be a mobile communication network or a public wireless fidelity (WiFi) network to which the wireless communication terminal 102 subscribes.

The first VPN gateway 108 is intended to constitute a VPN with the wireless communication terminal 102 when the wireless communication terminal 102 is connected to the external network 104. Also, the second VPN gateway 110 is intended to constitute a VPN with the wireless communication terminal 102 when the wireless communication terminal 102 is connected to the corporate intranet 106. In other words, in exemplary embodiments of the present disclosure, the wireless communication terminal 102 is connected to the corporate business system 112 via different VPN gateways according to the types of connected networks. Therefore, the administrator of the corporate business system 112 may differentiate provided security levels from each other according to connection locations of the wireless communication terminal 102 by applying security policies of different levels to the respective VPN gateways capable of being connected with the wireless communication terminal 102. For example, the administrator may apply different security policies to the respective VPN gateways so that the wireless communication terminal 102 may access only a previously set limited area 114 in the corporate business system 112 when the wireless communication terminal 102 connects to the corporate business system 112 via the first VPN gateway 108, and may access the entire corporate business system 112 without limitations when the wireless communication terminal 102 connects to the corporate business system 112 via the second VPN gateway 110. However, this is merely an example, and the administrator may apply various security policies in addition to the security policy of limiting accessible areas according to respective VPN gateways. For example, when the wireless communication terminal 102 connects to the corporate business system 112 via a particular VPN gateway, the administrator may limit file writing or access to a file of a specific type.

Meanwhile, in exemplary embodiments of the present disclosure, the corporate business system 112 denotes an intranet configured to permit only limited users to access. In this specification, the corporate business system 112 is assumed to be a computing infrastructure that is used for business by members of a particular company or organization. However, in exemplary embodiments of the present disclosure, the corporate business system 112 does not necessarily belong to a particular company or organization, and the purpose of the corporate business system 112 is not necessarily limited to business only.

Figure 2:
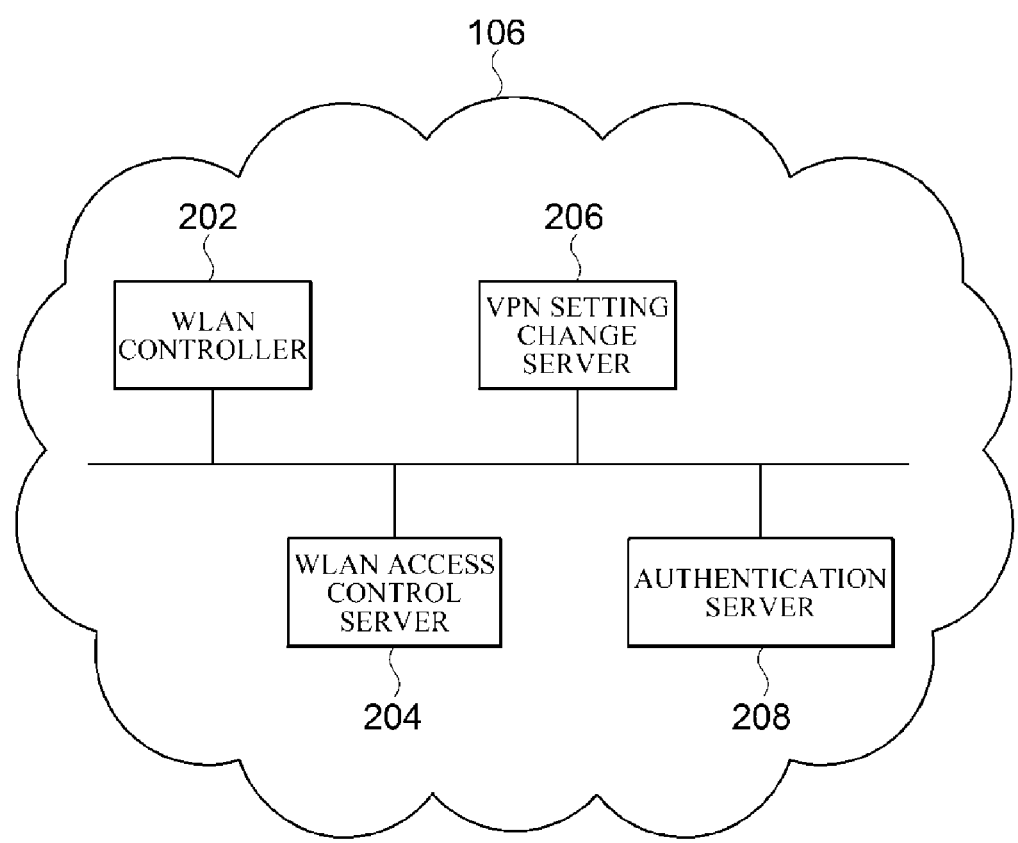
FIG. 2 is a block diagram of respective components constituting a corporate intranet according to an exemplary embodiment of the present disclosure.

FIG. 2 is a block diagram of respective components constituting the corporate intranet 106 according to an exemplary embodiment of the present disclosure. As shown in the drawing, the corporate intranet 106 according to an exemplary embodiment of the present disclosure includes a wireless local area network (WLAN) controller 202, a WLAN access control server 204, a VPN setting change server 206, and an authentication server 208.

The WLAN controller 202 authenticates the wireless communication terminal 102 when the wireless communication terminal initiates connecting to the corporate intranet 106, and grants or blocks the corporate intranet connection of the wireless communication terminal 102 according to the result of authentication.

When the wireless communication terminal 102 is connected to the corporate intranet 106 via the WLAN controller 202, the WLAN access control server 204 detects the connection and requests a change of the VPN setting of the wireless communication terminal 102 from the VPN setting change server 206. In an exemplary embodiment, when the WLAN controller 202 completes the authentication of the wireless communication terminal 102, the WLAN access control server 204 may determine that the wireless communication terminal 102 has connected to the corporate intranet 106. Also, the WLAN access control server 204 performs access control for the wireless communication terminal 102 connected to the corporate intranet 106.

The VPN setting change server 206 receives the request to change the VPN setting of the wireless communication terminal 102 from the WLAN access control server 204, and controls the wireless communication terminal 102 to change a VPN gateway currently in connection with the wireless communication terminal 102 from the first VPN gateway 108 to the second VPN gateway 110.

In an exemplary embodiment, the VPN setting change server 206 may be a mobile device management (MDM) server. In this case, the MDM server may control an MDM client included in the wireless communication terminal 102 to change the connection-target VPN gateway of the wireless communication terminal 102 to the second VPN gateway 110.

The authentication server 208 provides authentication information (authentication credentials) necessary for the WLAN controller 202 to authenticate the wireless communication terminal 102. In other words, the WLAN controller 202 compares an authentication request received from the wireless communication terminal 102 with the authentication information, thereby performing authentication of the wireless communication terminal 102.

The authentication server 208 may be configured to provide the authentication information of the wireless communication terminal 102 for which authentication has been completed by the WLAN controller 202 to the second VPN gateway 110. In this case, when the wireless communication terminal 102 connects to the second VPN gateway 110, the second VPN gateway 110 may authenticate the wireless communication terminal 102 using the received authentication information. In other words, in exemplary embodiments of the present disclosure, the WLAN controller 202 and the second VPN gateway 110 are configured to perform authentication using the same authentication information, and thus the wireless communication terminal 102 may simultaneously establish connections with the corporate intranet 106 and the second VPN gateway 110 through only one authentication operation.

According to an example embodiment, the wireless communication terminal 102, the first VPN gateway 108, the second VPN gateway 110, the WLAN controller 202, the WLAN access control server 204, the VPN setting change server 206, and the authentication server 208 are implemented as general purpose computers each having a processor such as a CPU, a memory under control of the processor, a storage and a user interface for accepting user inputs and displaying processing results.

Figure 3:
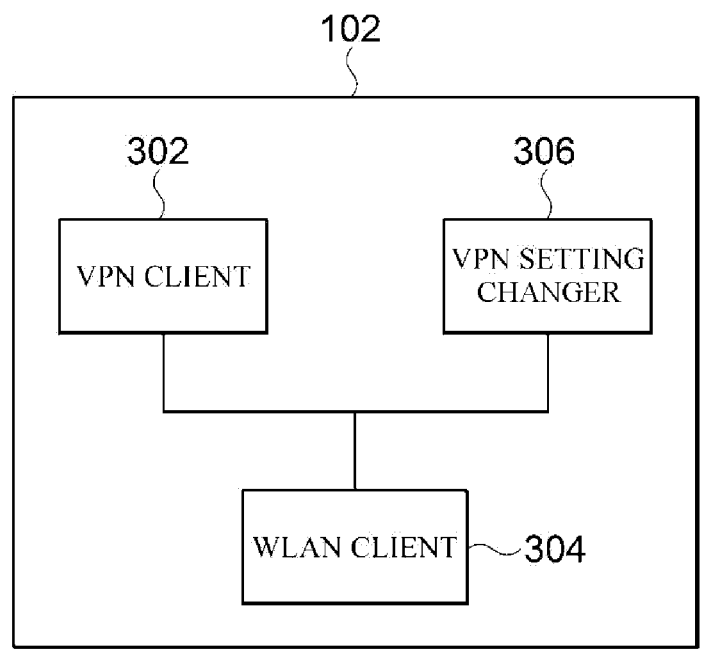
FIG. 3 is a block diagram for illustrating a detailed constitution of a wireless communication terminal according to an exemplary embodiment of the present disclosure.

FIG. 3 is a block diagram for illustrating a detailed constitution of the wireless communication terminal 102 according to an exemplary embodiment of the present disclosure. As shown in the drawing, the wireless communication terminal 102 according to an exemplary embodiment of the present disclosure includes a VPN client 302, a WLAN client 304, and a VPN setting changer 306.

The VPN client 302 connects to the first VPN gateway 108 or the second VPN gateway 110 and forms a VPN. As described above, the VPN client 302 forms a VPN with the first VPN gateway 108 when the wireless communication terminal 102 connects to the external network 104, and forms a VPN with the second VPN gateway 110 when the wireless communication terminal 102 connects to the corporate intranet 106. At this time, a target VPN gateway to which the VPN client 302 connects is determined according to a VPN connection profile received from the outside of the VPN client 302. In other words, the VPN client 302 is configured to connect to the first VPN gateway 108 when a currently set VPN gateway address of the VPN connection profile is the first VPN gateway 108, and connect to the second VPN gateway 110 when the currently set VPN gateway address is the second VPN gateway 110. Also, the VPN client 302 may be configured to form a VPN with the first VPN gateway 108 or the second VPN gateway 110 only when the wireless communication terminal 102 is in a security mode.

The WLAN client 304 establishes a wireless network connection with the corporate intranet 106. Specifically, the WLAN client 304 is connected to the WLAN controller 202 via a wireless access point (AP) (not shown) and is connected to the corporate intranet 106 through terminal authentication of the WLAN controller 202.

When the wireless network connection of the WLAN client 304 is established, the VPN setting changer 306 receives a VPN gateway change request from the VPN setting change server 206 that recognizes the establishment of the wireless network connection, and controls the VPN client 302 to change the VPN gateway currently in connection with the VPN client 302 to the second VPN gateway 110 in accordance with the VPN gateway change request. Specifically, the VPN setting changer 306 may change the VPN gateway currently in connection with the VPN client 302 to the second VPN gateway 110 by changing an existing VPN connection profile to the VPN connection profile of the second VPN gateway 110.

In addition, when the wireless network connection of the WLAN client 304 is cut off, the VPN setting changer 306 receives a VPN gateway change-back request from the VPN setting change server 206 that recognizes the disconnection of the wireless network connection, and controls the VPN client 302 to change the VPN gateway currently in connection with the VPN client 302 back to the first VPN gateway 108 in accordance with the VPN gateway change-back request. In other words, in this exemplary embodiment, the VPN setting change server 206 determines a VPN gateway to be connected with the wireless communication terminal 102 according to whether or not the wireless communication terminal 102 is in connection with the corporate intranet 106 and transmits a resultant VPN gateway change request to the VPN setting changer 306, and the VPN setting changer 306 controls the VPN client 302 in accordance with the received VPN gateway change request.

In an exemplary embodiment, the VPN setting changer 306 may be a MDM client, and the VPN setting change server 206 may be an MDM server. This is because most standard VPN clients included in the wireless communication terminal 102 may be controlled by only a particular application bearing the signature of an MDM provider or a terminal vendor except for a case in which standard VPN clients are manually controlled by a user.

Figure 4:
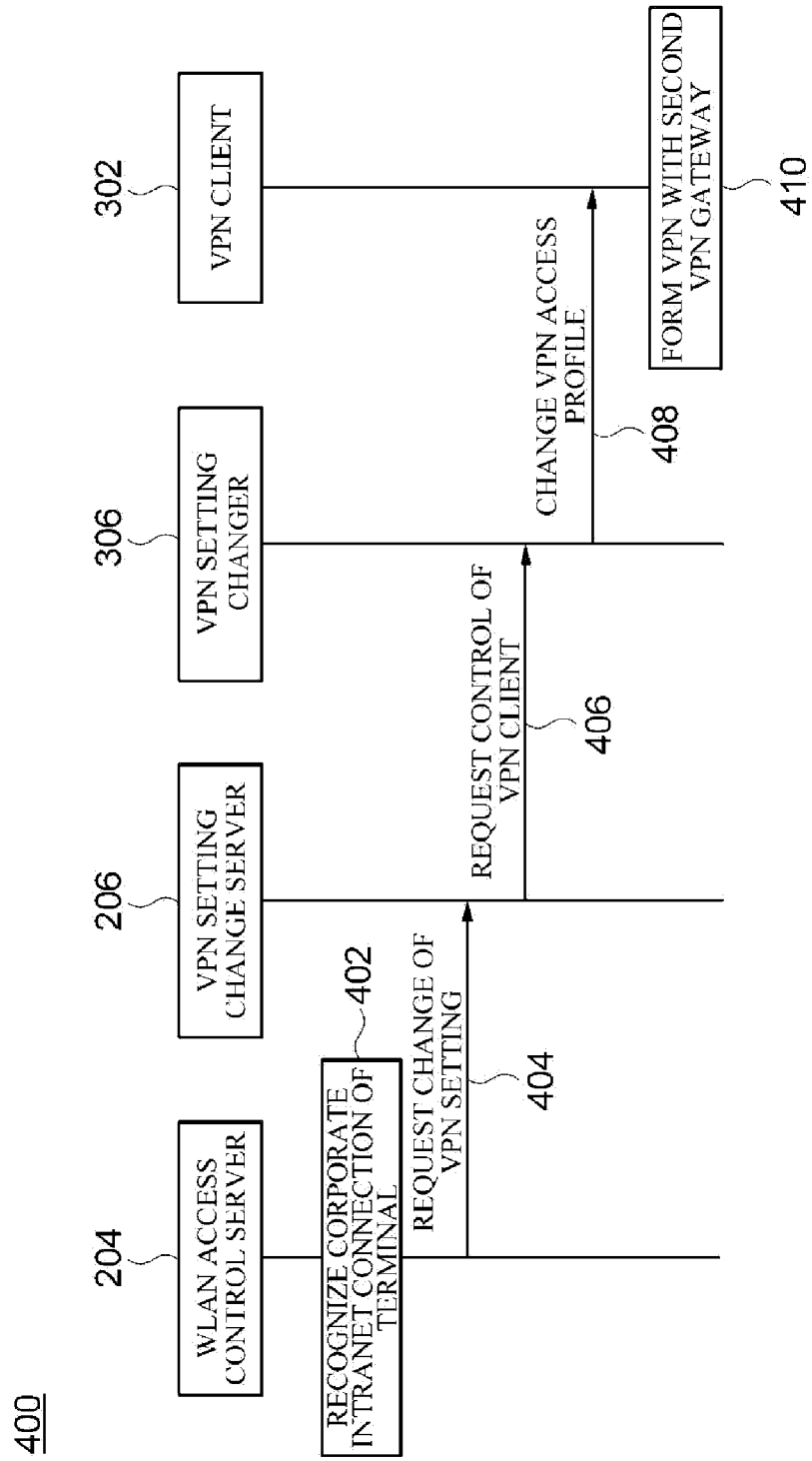
FIG. 4 is a flowchart illustrating a VPN access control method for changing a first VPN gateway to a second VPN gateway according to an exemplary embodiment of the present disclosure when a wireless communication terminal forming a VPN connection with the first VPN gateway joins a corporate intranet.

FIG. 4 is a flowchart illustrating a VPN access control method 400 for changing the first VPN gateway 108 to the second VPN gateway 110 according to an exemplary embodiment of the present disclosure when the wireless communication terminal 102 forming a VPN connection with the first VPN gateway 108 joins the corporate intranet 106.

In operation 402, the WLAN access control server 204 recognizes the connection of the wireless communication terminal 102 with the corporate intranet 106. As mentioned above, when the WLAN controller 202 completes the authentication of the wireless communication terminal 102, the WLAN access control server 204 may recognize that the wireless communication terminal 102 has connected to the corporate intranet 106.

In operation 404, the WLAN access control server 204 requests a change of the VPN setting of the wireless communication terminal 102 from the VPN setting change server 206.

In operation 406, the VPN setting change server 206 requests the VPN setting changer 306 of the wireless communication terminal 102 to control the VPN client 302 to change the VPN connection profile of the VPN client 302 to the VPN connection profile of the second VPN gateway 110.

In operation 408, according to the request of operation 406, the VPN setting changer 306 changes the VPN connection profile of the VPN client 302 to the VPN connection profile of the second VPN gateway 110. At this time, the VPN setting changer 306 may newly generate and provide the VPN connection profile of the second VPN gateway 110 to the VPN client 302, or may select the VPN connection profile of the second VPN gateway 110 from among VPN connection profiles registered in advance with the VPN client 302.

In operation 410, the VPN client 302 forms a VPN with the second VPN gateway 110 according to the changed VPN connection profile. At this time, the VPN client 302 may be configured to connect back to the first VPN gateway 108 when a connection attempt to the second VPN gateway 110 fails in operation 410. According to an example embodiment, the VPN client 302 may attempt to the second VPN gateway 110 by sending a connection request to the second VPN gateway 110. The VPN client 302 may determine that the connection attempt to the second VPN gateway 110 fails when the VPN client 302 does not receive a response to the connection request within a predetermined time period or the VPN client 302 receives a connection denial message from the second VPN gateway.

Figure 5:
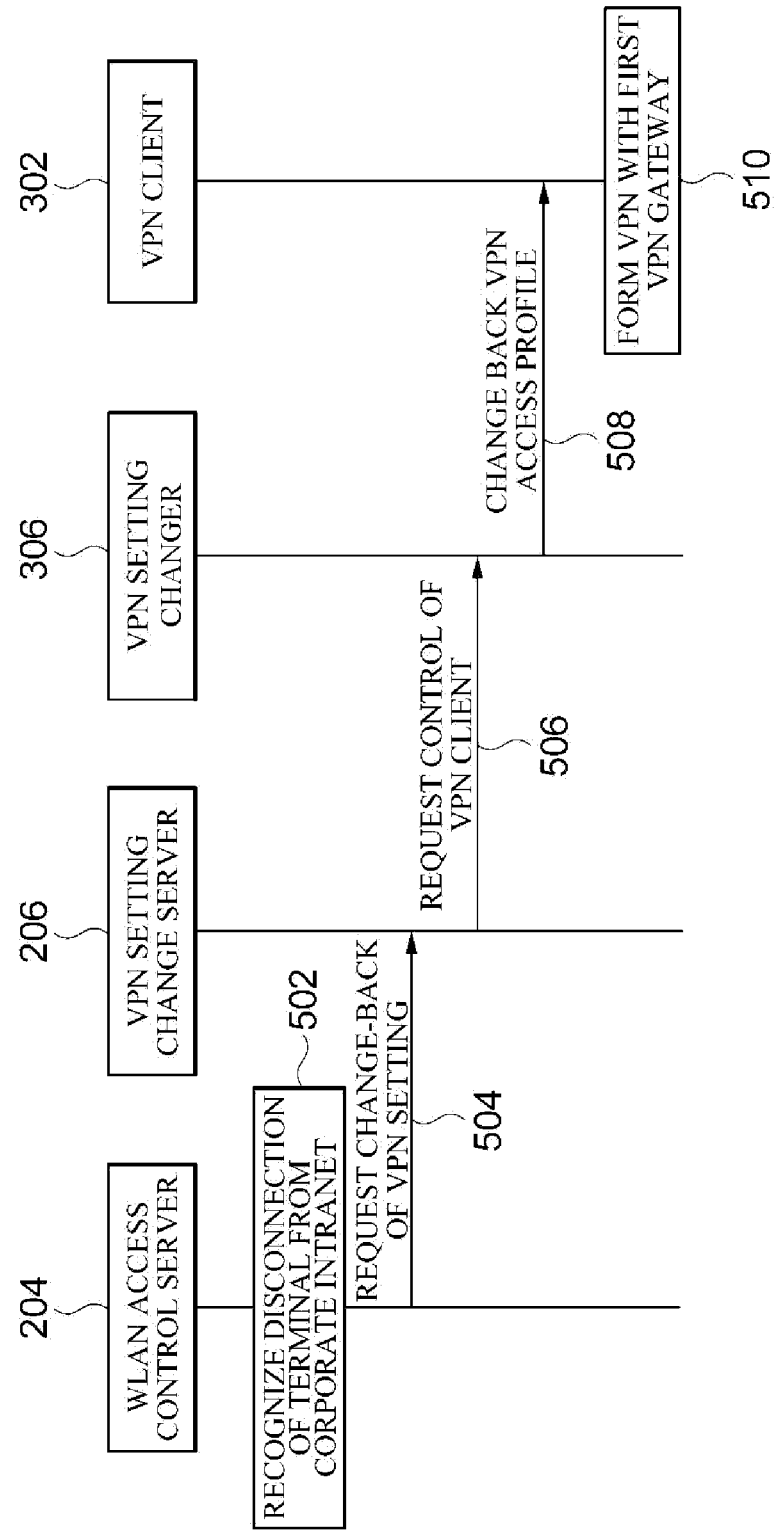
FIG. 5 is a flowchart illustrating a VPN access control method for changing the second VPN gateway back to the first VPN gateway according to the exemplary embodiment of the present disclosure when the wireless communication terminal forming a VPN connection with the second VPN gateway leaves the corporate intranet.

FIG. 5 is a flowchart illustrating a VPN access control method 500 for changing the second VPN gateway 110 back to the first VPN gateway 108 according to the exemplary embodiment of the present disclosure when the wireless communication terminal 102 forming a VPN connection with the second VPN gateway 110 leaves the corporate intranet 106.

In operation 502, the WLAN access control server 204 recognizes the disconnection of the wireless communication terminal 102 from the corporate intranet 106.

In operation 504, the WLAN access control server 204 requests the VPN setting change server 206 to change back the VPN setting of the wireless communication terminal 102.

In operation 506, the VPN setting change server 206 requests the VPN setting changer 306 of the wireless communication terminal 102 to control the VPN client 302 to change the VPN connection profile of the VPN client 302 to the VPN connection profile of the first VPN gateway 108.

In operation 508, in accordance with the request of operation 506, the VPN setting changer 306 changes the VPN connection profile of the VPN client 302 to the VPN connection profile of the first VPN gateway 108. At this time, the VPN setting changer 306 may newly generate and provide the VPN connection profile of the first VPN gateway 108 to the VPN client 302, or may select the VPN connection profile of the first VPN gateway 108 from among VPN connection profiles registered in advance with the VPN client 302.

In operation 510, the VPN client 302 forms a VPN with the first VPN gateway 108 according to the changed VPN connection profile.

Figure 6:
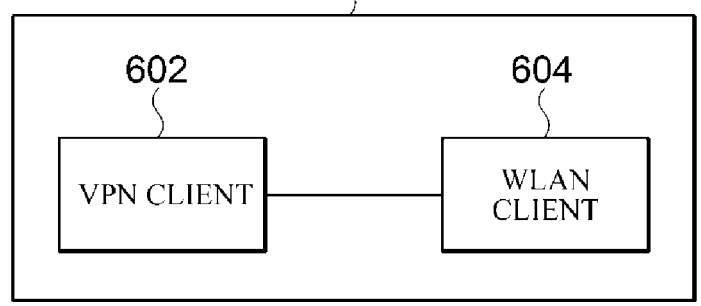
FIG. 6 is a block diagram for illustrating a detailed constitution of a wireless communication terminal according to another exemplary embodiment of the present disclosure.

FIG. 6 is a block diagram for illustrating a detailed constitution of a wireless communication terminal 102 according to another exemplary embodiment of the present disclosure. As shown in the drawing, the wireless communication terminal 102 according to the other exemplary embodiment of the present disclosure includes a VPN client 602 and a WLAN client 604. This exemplary embodiment may be applied to an environment in which the WLAN client 604 is capable of directly controlling the VPN client 602 without an authenticated client such as an MDM client.

The VPN client 602 connects to the first VPN gateway 108 or the second VPN gateway 110 and forms a VPN. Like in the preceding exemplary embodiment, the VPN client 602 forms a VPN with the first VPN gateway 108 when the wireless communication terminal 102 connects to the external network 104, and forms a VPN with the second VPN gateway 110 when the wireless communication terminal 102 connects to the corporate intranet 106. At this time, a target VPN gateway to which the VPN client 602 connects is determined according to a VPN connection profile received from the outside of the VPN client 602. In other words, the VPN client 602 is configured to connect to the first VPN gateway 108 when a currently set VPN gateway address of the VPN connection profile is the first VPN gateway 108, and connect to the second VPN gateway 110 when the currently set VPN gateway address is the second VPN gateway 110. Also, as mentioned above, the VPN client 602 may be configured to form a VPN with the first VPN gateway 108 or the second VPN gateway 110 only when the wireless communication terminal 102 is in the security mode.

The WLAN client 604 establishes a wireless network connection with the corporate intranet 106. Specifically, the WLAN client 604 is connected to the WLAN controller 202 via a wireless AP (not shown) and is connected to the corporate intranet 106 through terminal authentication of the WLAN controller 202.

When the wireless network connection is completed, the WLAN client 604 controls the VPN client 602 to change the VPN gateway currently in connection with the VPN client 602 to the second VPN gateway 110. Specifically, the WLAN client 604 may change a VPN gateway currently in connection with the VPN client 602 to the second VPN gateway 110 by changing an existing VPN connection profile to the VPN connection profile of the second VPN gateway 110. Also, when the wireless network connection with the corporate intranet 106 is cut off, the WLAN client 604 controls the VPN client 602 to change the VPN gateway currently in connection with the VPN client 602 back to the first VPN gateway 108.

Figure 7:
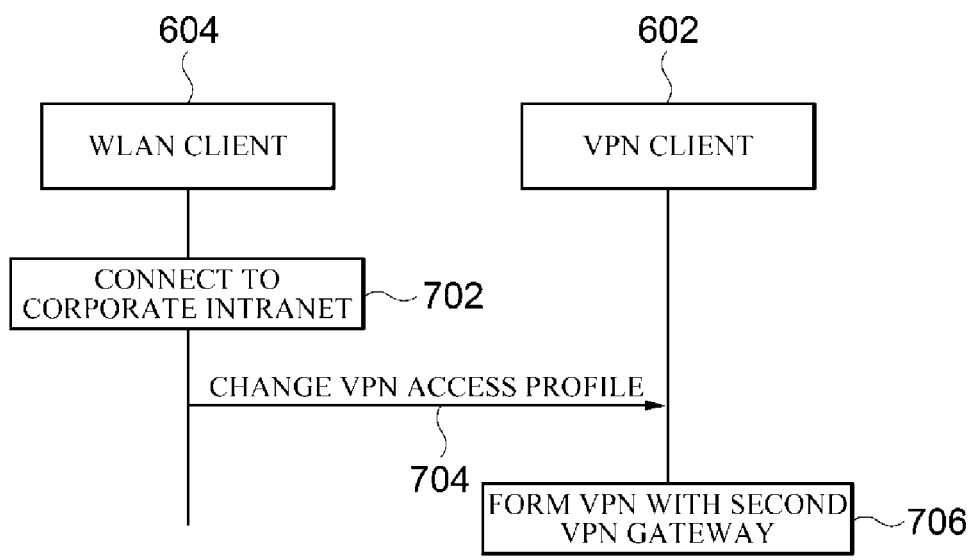
FIG. 7 is a flowchart illustrating a VPN access control method for changing a first VPN gateway to a second VPN gateway according to the other exemplary embodiment of the present disclosure when a wireless communication terminal forming a VPN connection with the first VPN gateway joins a corporate intranet.

FIG. 7 is a flowchart illustrating a VPN access control method 700 for changing the first VPN gateway 108 to the second VPN gateway 110 according to the other exemplary embodiment of the present disclosure when the wireless communication terminal 102 forming a VPN connection with the first VPN gateway 108 joins the corporate intranet 106.

In operation 702, the WLAN client 604 establishes a wireless network connection with the corporate intranet 106.

In operation 704, the WLAN client 604 changes the VPN connection profile of the VPN client 602 to the VPN connection profile of the second VPN gateway 110. At this time, the WLAN client 604 may newly generate and provide the VPN connection profile of the second VPN gateway 110 to the VPN client 602, or may select the VPN connection profile of the second VPN gateway 110 from among VPN connection profiles registered in advance with the VPN client 602.

In operation 706, the VPN client 602 forms a VPN with the second VPN gateway 110 according to the changed VPN connection profile. At this time, the VPN client 602 may be configured to connect back to the first VPN gateway 108 when a connection attempt to the second VPN gateway 110 fails in operation 706.

Figure 8:
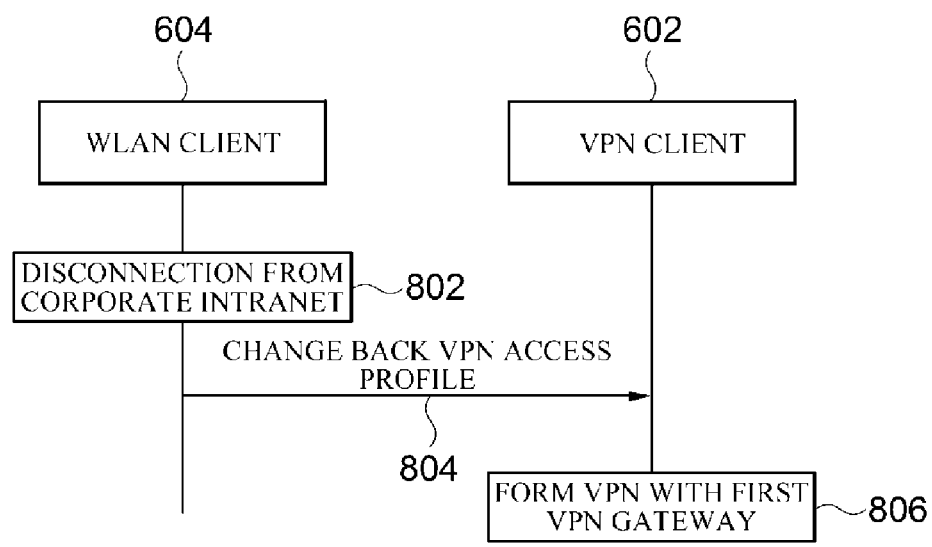
FIG. 8 is a flowchart illustrating a VPN access control method for changing the second VPN gateway back to the first VPN gateway according to the other exemplary embodiment of the present disclosure when a wireless communication terminal forming a VPN connection with the second VPN gateway leaves the corporate intranet.

FIG. 8 is a flowchart illustrating a VPN access control method 800 for changing the second VPN gateway 110 back to the first VPN gateway 108 according to the other exemplary embodiment of the present disclosure when the wireless communication terminal 102 forming a VPN connection with the second VPN gateway 110 leaves the corporate intranet 106.

In operation 802, the WLAN client 604 recognizes the wireless network disconnection from the corporate intranet 106.

In operation 804, the WLAN client 604 changes the VPN connection profile of the VPN client 602 back to the VPN connection profile of the first VPN gateway 108. At this time, the WLAN client 604 may newly generate and provide the VPN connection profile of the first VPN gateway 108 to the VPN client 602, or may select the VPN connection profile of the first VPN gateway 108 from among VPN connection profiles registered in advance with the VPN client 602.

In operation 806, the VPN client 602 forms a VPN with the first VPN gateway 108 according to the changed VPN connection profile.

Meanwhile, exemplary embodiments of the present disclosure can include a computer-readable recording medium including a program for performing the methods described herein on a computer system. The computer-readable recording medium can include a program command, a local data file, a data structure, etc., solely or in a combined manner. The computer-readable recording medium may be specially designed and configured for the present disclosure, or generally available in the field of computer software. Examples of the computer-readable recording medium include magnetic media, such as a hard disk, a floppy disk, and a magnetic tape, optical recording media, such as a CD-ROM and a DVD, magneto-optical media, such as a floptical disk, and hardware devices, such as a ROM, a RAM, and a flash memory, specially configured to store and execute program commands. Examples of the program commands may include high-level language codes executable by a computer using an interpreter, etc., as well as machine language codes made by compilers.

According to exemplary embodiments of the present disclosure, the connection environment of a terminal capable of connecting to a corporate business system is recognized, and a security policy of a level varying according to the recognized connection environment is applied. Therefore, it is possible to achieve convenience of business and also strengthen the security of a corporate business system.

In addition, according to exemplary embodiments of the present disclosure, a wireless LAN controller and a VPN gateway authenticate a wireless communication terminal using the same authentication information, and thus it is possible to simultaneously complete WLAN authentication and VPN authentication through one authentication process.

Although the present disclosure has been described through exemplary embodiments, it shall be appreciated that various permutations and modifications of the described embodiments are possible by those of ordinary skill in the art to which the present disclosure pertains without departing from the scope of the disclosure.

Therefore, the scope of the present disclosure shall not be defined by the described embodiments but shall be defined by the appended claims and their equivalents.

What is claimed is:

1. A system for controlling virtual private network (VPN) access, the system comprising:
   a first VPN gateway constituting a VPN with a wireless communication terminal when the wireless communication terminal is connected to an external network;
   a second VPN gateway constituting a VPN with the wireless communication terminal when the wireless communication terminal is connected to a corporate intranet;
   a wireless local area network (WLAN) access control server comprising a processor coupled to a memory, the processor configured to detect a connection of the wireless communication terminal to the corporate intranet via the first VPN gateway, and in response to detecting the connection, configured to transmit a request to change a VPN setting of the wireless communication terminal; and
   a VPN setting change server configured to receive, from the WLAN access control server, the request to change the VPN setting of the wireless communication terminal, and to control the wireless communication terminal to change the first VPN gateway currently in connection with the wireless communication terminal to the second VPN gateway in accordance with the request to change the VPN setting, wherein, when a disconnection of the corporate intranet connection of the wireless communication terminal is detected, the WLAN access control server transmits, to the VPN setting change server, a VPN setting change-back request to change back the VPN setting of the wireless communication terminal, and the VPN setting change server controls the wireless communication terminal to change the second VPN gateway currently in connection with the wireless communication terminal to the first VPN gateway in accordance with the VPN setting change-back request.

2. The system of claim 1, further comprising:
a WLAN controller configured to authenticate the wireless communication terminal when the wireless communication terminal initiates the corporate intranet connection; and
an authentication server configured to provide authentication information for authentication of the wireless communication terminal, to the WLAN controller,
wherein the WLAN access control server determines that the wireless communication terminal is connected to the corporate intranet when the authentication of the wireless communication terminal is completed by the WLAN controller.

3. The system of claim 2, wherein, when the authentication of the wireless communication terminal is completed, the authentication server provides the authentication information of the wireless communication terminal to the second VPN gateway, and
the second VPN gateway authenticates the wireless communication terminal using the received authentication information when the wireless communication terminal connects to the second VPN gateway.

4. The system of claim 1, wherein the VPN setting change server is a mobile device management (MDM) server.

5. The system of claim 4, wherein the MDM server controls an MDM client included in the wireless communication terminal to change a connection-target VPN gateway of the wireless communication terminal to the second VPN gateway.

6. A wireless communication terminal comprising a processor coupled to a memory, the processor comprising:
a virtual private network (VPN) client configured to connect to a first VPN gateway and form a VPN with the first VPN gateway;
a wireless local area network (WLAN) client configured to establish a wireless network connection with a corporate intranet; and
a VPN setting changer configured to receive, from a VPN setting change server, when the wireless network connection of the WLAN client is completed, a first VPN gateway control request including an access address of a second VPN gateway, and to control the VPN client to change the first VPN gateway currently in connection with the VPN client to the second VPN gateway in accordance with the first VPN gateway control request,
wherein, when the wireless network connection of the WLAN client is disconnected, the VPN setting changer receives a second VPN gateway control request from the VPN setting change server and controls the VPN client to change the second VPN gateway currently in connection with the VPN client back to the first VPN gateway in accordance with the second VPN gateway control request, wherein the first VPN gateway constitutes a VPN with the wireless communication terminal when the wireless communication terminal is connected to an external network, and the second VPN gateway constitutes a VPN with the wireless communication terminal when the wireless communication terminal is connected to the corporate intranet.

7. The wireless communication terminal of claim 6, wherein the VPN client forms the VPN when the wireless communication terminal is in a security mode.

8. The wireless communication terminal of claim 6, wherein the VPN setting changer is a mobile device management (MDM) client, and
the VPN setting change server is an MDM server.

9. The wireless communication terminal of claim 6, wherein the VPN client attempts to connect to the second VPN gateway, and connects back to the first VPN gateway when the connection attempt fails.

10. A wireless communication terminal comprising a processor coupled to a memory, the processor comprising:
a virtual private network (VPN) client configured to connect to a first VPN gateway and form a VPN with the first VPN gateway; and
a wireless local area network (WLAN) client configured to establish a wireless network connection with a corporate intranet, and to control the VPN client to attempt to change the first VPN gateway currently in connection with the VPN client to a second VPN gateway when the wireless network connection is completed,
wherein, when the wireless network connection with the corporate intranet is disconnected, the WLAN client controls the VPN client to change the second VPN gateway currently in connection with the VPN client back to the first VPN gateway,
wherein the first VPN gateway constitutes a VPN with the wireless communication terminal when the wireless communication terminal is connected to an external network, and the second VPN gateway constitutes a VPN with the wireless communication terminal when the wireless communication terminal is connected to the corporate intranet.

11. The wireless communication terminal of claim 10, wherein the VPN client attempts to connect to the second VPN gateway in a connection attempt, and connects back to the first VPN gateway when the connection attempt fails.

12. A method of controlling virtual private network (VPN) access, the method comprising:
detecting, by a wireless local area network (WLAN) access control server, a connection of a wireless communication terminal attempting to connect to a corporate intranet via a first VPN gateway;
in response to the detecting, transmitting, by the WLAN access control server, a request to change a VPN setting of the wireless communication terminal, to a VPN setting change server;
receiving, by the VPN setting change server, the request to change the VPN setting of the wireless communication terminal, from the WLAN access control server; and
controlling, by the VPN setting change server, the wireless communication terminal to change the first VPN gateway currently in connection with the wireless communication terminal to a second VPN gateway in accordance with the request to change a VPN setting, and when a disconnection of the corporate intranet connection of the wireless communication terminal is detected, transmitting, by the WLAN access control server to the VPN setting change server, a VPN setting change-back request to change back the VPN setting of the wireless communication terminal, wherein the VPN setting change server controls the wireless communication terminal to change the second VPN gateway currently in connection with the wireless communication terminal to the first VPN gateway in accordance with the VPN setting change-back request, wherein the first VPN gateway constitutes a VPN with the wireless communication terminal when the wireless communication terminal is connected to an external network, and the second VPN gateway constitutes a VPN with the wireless communication terminal when the wireless communication terminal is connected to the corporate intranet.

13. The method of claim 12, further comprising, before the detecting of the corporate intranet connection:

when the wireless communication terminal attempts the corporate intranet connection, receiving, by a WLAN controller, authentication information of the wireless communication terminal, from an authentication server; and authenticating, by the WLAN controller, the wireless communication terminal using the received authentication information, wherein the detecting of the corporate intranet connection comprises determining that the wireless communication terminal has connected to the corporate intranet when the authentication of the wireless communication terminal is completed by the WLAN controller.

14. The method of claim 13, further comprising, after the authenticating of the wireless communication terminal, providing, by the authentication server, the authentication information of the wireless communication terminal to the second VPN gateway, wherein the second VPN gateway authenticates the wireless communication terminal using the received authentication information when the wireless communication terminal connects to the second VPN gateway.

15. A method of controlling virtual private network (VPN) access of a wireless communication terminal, the method comprising:

connecting, by a VPN client, to a first VPN gateway and forming a VPN with the first VPN gateway;

establishing, by a wireless local area network (WLAN) client, a wireless network connection with a corporate intranet;

receiving, by a VPN setting changer when the wireless network connection of the WLAN client is completed, a first VPN gateway control request from a VPN setting change server; and controlling, by the VPN setting changer, the VPN client to attempt to change the first VPN gateway currently in connection with the VPN client to the second VPN gateway in accordance with the first VPN gateway control request, wherein, when the wireless network connection of the WLAN client is disconnected, the VPN setting changer receives a second VPN gateway control request from the VPN setting change server and controls the VPN client to change the VPN gateway currently in connection with the VPN client back to the first VPN gateway in accordance with the second VPN gateway control request, wherein the first VPN gateway constitutes a VPN with the wireless communication terminal when the wireless communication terminal is connected to an external network, and the second VPN gateway constitutes a VPN with the wireless communication terminal when the wireless communication terminal is connected to the corporate intranet.

16. The method of claim 15, wherein the VPN client forms the VPN when the wireless communication terminal is in a security mode.

17. The method of claim 15, wherein the VPN client attempts to connect to the second VPN gateway in a connection attempt, and connects back to the first VPN gateway when the connection attempt fails.

18. A method of controlling virtual private network (VPN) access, the method comprising:

connecting, by a VPN client, to a first VPN gateway and forming a VPN with the first VPN gateway;

establishing, by a wireless local area network (WLAN) client, a wireless network connection with a corporate intranet; and controlling, by the WLAN client, the VPN client to attempt to change the first VPN gateway currently in connection with the VPN client to a second VPN gateway when the wireless network connection is completed, wherein, when the wireless network connection with the corporate intranet is disconnected, the WLAN client controls the VPN client to change the second VPN gateway currently in connection with the VPN client back to the first VPN gateway, wherein the first VPN gateway constitutes a VPN with the wireless communication terminal when the wireless communication terminal is connected to an external network, and the second VPN gateway constitutes a VPN with the wireless communication terminal when the wireless communication terminal is connected to the corporate intranet.

19. The method of claim 18, wherein the VPN client attempts to connect to the second VPN gateway in a connection attempt, and connects back to the first VPN gateway when the connection attempt fails.

* * * * *